Patented June 9, 1925.

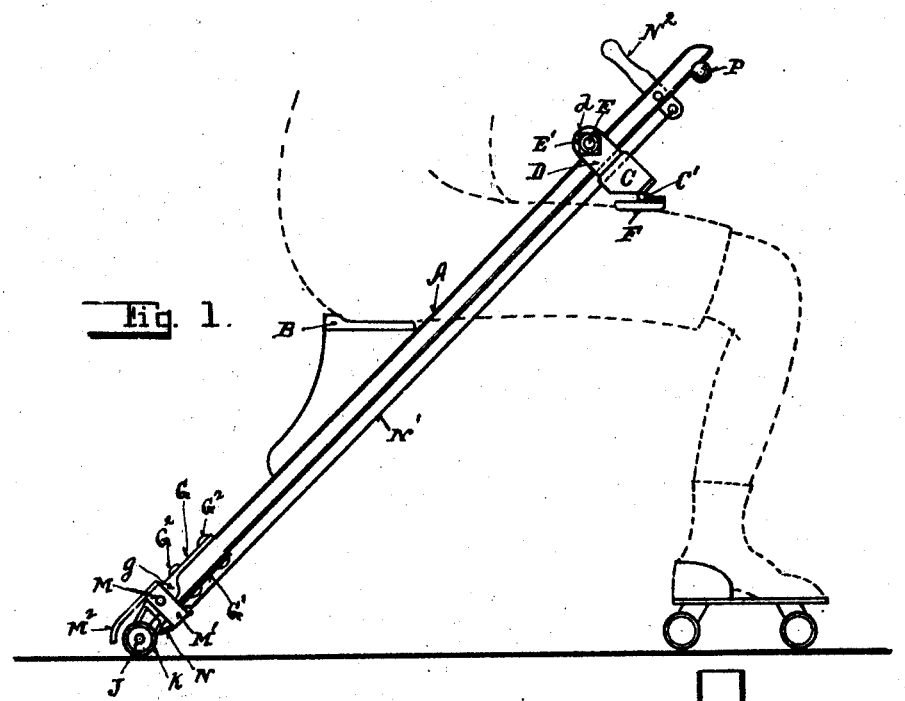
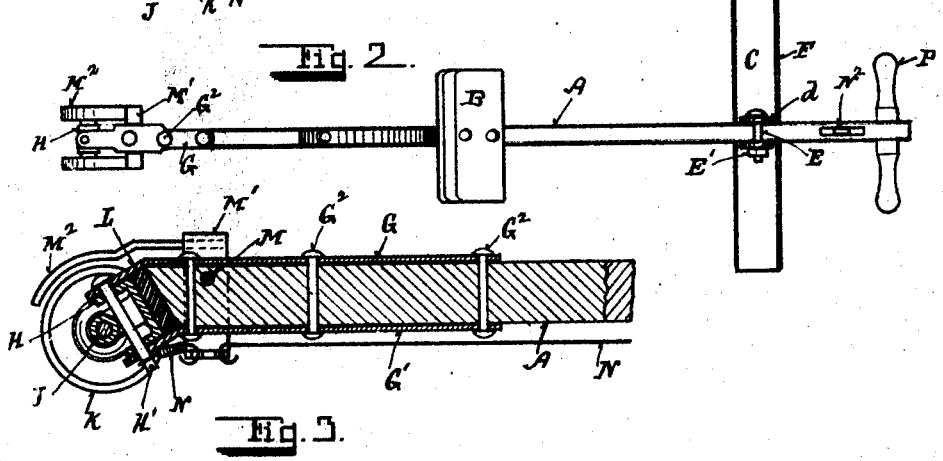

1,541,763

UNITED STATES PATENT OFFICE.

DAVID W. DUNBERG, OF NEW YORK, N. Y., ASSIGNOR TO COASTER SKATE MANUFACTURING COMPANY, INC., OF ERIE, PENNSYLVANIA.

COASTER SKATE.

Application filed February 24, 1925. Serial No. 11,361.

*To all whom it may concern:*

Be it known that I, DAVID W. DUNBERG, a citizen of the United States, residing at New York, in the county of New York and State of New York, have invented certain new and useful Improvements in Coaster Skates; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to toys of the type known as a coaster skate, which is adapted for use when skating.

The object of this invention is to provide an apparatus adapted to serve as a seat upon which a person, when skating, can sit and coast when desired.

The present invention consists in certain improvements upon devices of this character shown and described in U. S. Patent No. 1,003,537 issued September 19, 1911, by means of which such devices are better adapted for use.

The features of this invention are hereinafter fully shown and described, and are illustrated in the accompanying drawings in which:

Figure 1 is a side view of my improved coaster skate.

Figure 2 is a plan view of the same.

Figure 3 is an enlarged longitudinal section of a fragment of the same.

In these drawings A indicates a bar upon which is secured a seat B upon the intermediate portion thereof, and adjustably secured upon said bar is a cross-piece C, by means of a U-shaped clamp D, the arms $d$ of which embrace the sides of the bar A, and are clamped against the bar A by means of a bolt E and nut E'. The cross-piece C is adapted to rest across the knees of the user when seated upon the seat B, as indicated by broken lines in Figure 1. By releasing the arms $d$ of the clamp D the location of the cross-piece C can be longitudinally adjusted on the bar A to correspond with length of the legs of the user so as to have the cross-piece D near or away from the seat B, as may be desired.

Pivoted upon the under side of the cross-piece D, by means of hinges C' is a flat bar F which is adapted to adjust itself to the upper surface of the legs of the user upon which it rests so as to ensure comfort.

Upon the lower end of the bar A, I secure metallic straps G and G', which project beyond the end of the bar A, by means of bolts or rivets $G^2$, and between the projecting ends of the straps G and G' I pivot a bearing block H by means of a pivot pin H'. Mounted in the block H is a transverse axle J, upon which roller wheels K are mounted. If desired ice skate runners, not shown, can be secured on the block H in place of the rollers K. Between the block H and the end of the bar A a block of resilient material L, such as rubber, is preferably placed, which by reason of its nature tends to maintain the block H in alignment with the bar A.

Pivoted on the bar A, adjacent to the lever end thereof, by means of a transverse pin M, is a U-shaped lever M', and a spring N is provided to yieldingly maintain the same in the position thereof shown in Fig. 3. Secured upon the upper ends of the arms of the lever M' are brake arms $M^2$ which extend downwardly over the wheels K, and are adapted, when operated, to engage said wheels for the purpose of retarding the rotation of the same when desired. A wire N' extends from the lever N to an operating lever $N^2$ mounted on the bar A adjacent to the upper end thereof.

Secured at the upper end of the bar A is a transverse hand bar P, adapted to be grasped by the user of the device.

The metal strap G is provided with wings $g$ which extend downwardly over the sides of the bar A to give strength thereto, and prevent the bar A, which is usually made of wood, from splitting.

In operation the user, whether mounted on roller skates or ice skates, gets up the proper momentum and then thrusts the bar A backwardly between his legs and sits down upon the seat B, and coasts as desired. Or he can use the device as a seat and remain stationary as desired.

Having thus fully described my invention so as to enable others to utilize the same, I do not desire to be limited to the exact construction shown and described, as many modifications can be made therein without departing from the scope of my invention, therefore what I claim as new and desire to secure by Letters Patent is:

1. In a device for use as described, a bar adapted to rest upon the ground, a seat secured intermediately of the length of said bar, a cross-piece, means to secure the same to said bar, and a plate pivoted on said cross-piece adapted for horizontal self adjustment.

2. In a device for use as described, a bar adapted to rest upon the ground, a seat secured intermediately of the length of said bar, a cross-piece, means to secure the same to said bar, and a plate centrally and longitudinally hinged to said cross-piece, whereby said plate will adjust the plane thereof to an object upon which it is placed.

3. In a device for use as described, a bar, a pair of rollers, a transverse axle connecting the same and mounted in a bearing block, straps secured on the upper and under sides of said bar, a pivot pin passing angularly through said straps and block, means to yieldingly maintain said block in alignment with said bar, a seat on said bar, a cross-piece adapted to rest upon the knees of a person seated upon said seat, and means to secure said cross-piece on said bar.

In testimony whereof I affix my signature.

DAVID W. DUNBERG.